United States Patent [19]
Kohler et al.

[11] 4,196,019
[45] Apr. 1, 1980

[54] WASHING APPARATUS FOR BUOYANT MATERIAL

[75] Inventors: Wolf-Ulrich Kohler, Krefeld; Clemens Lenzen, Viersen, both of Fed. Rep. of Germany

[73] Assignee: Maschinenfabrik Buckau R. Wolf Aktiengesellschaft, Grevenbroich, Fed. Rep. of Germany

[21] Appl. No.: 919,948

[22] Filed: Jun. 28, 1978

[51] Int. Cl.² ............... B08B 3/04; B08B 11/00
[52] U.S. Cl. .................. 134/104; 134/111; 134/134
[58] Field of Search ............ 134/104, 109, 111, 134

[56] References Cited

U.S. PATENT DOCUMENTS

| | | | |
|---|---|---|---|
| 2,860,785 | 11/1958 | Gardner | 134/111 X |
| 3,148,687 | 9/1964 | Dosch | 134/111 X |
| 4,073,661 | 2/1978 | Buzga et al. | 134/183 X |

FOREIGN PATENT DOCUMENTS

| | | | |
|---|---|---|---|
| 838117 | 5/1952 | Fed. Rep. of Germany | 134/104 |
| 1195186 | 6/1965 | Fed. Rep. of Germany | 134/104 |
| 1432316 | 4/1969 | Fed. Rep. of Germany | 134/104 |
| 2353266 | 4/1975 | Fed. Rep. of Germany | 134/134 |

Primary Examiner—Robert L. Bleutge
Attorney, Agent, or Firm—Michael J. Striker

[57] ABSTRACT

Apparatus for washing soiled comminuted products, such as comminuted plastic foils, bands or the like comprises an elongated container adapted to be filled up to a predetermined level with a washing solution into which the products to be washed are fed at one end of the container and discharged from the other end, in which a separating wall extending transverse through the container between the ends thereof defines in the container a washing zone between the one end of the container and the separating wall and a discharge zone between the separating wall and the other end of the container, and in which an agitating device is provided in the washing zone for agitating the products therein and for driving the products below a lower edge of the separating wall from the washing zone to the discharge zone, from where the cleaned products are discharged by a discharging device including a sieve drum rotatable about an axis extending transverse to the longitudinal direction of the container.

15 Claims, 3 Drawing Figures

WASHING APPARATUS FOR BUOYANT MATERIAL

BACKGROUND OF THE INVENTION

The present invention relates to an apparatus for washing soiled comminuted products, especially comminuted plastic foils, bands or the like, in which the apparatus includes an elongated container adapted to be filled up to a predetermined level with a washing solution into which the products to be cleaned are fed at one end of the container into the latter and discharged from the other end thereof, in which a separating wall extends transversely through the container between the ends thereof and defines in the container a washing zone between the one end of the container and the separating wall and a discharge zone between the separating wall and the other end of the container and in which agitating means are provided in the washing zone for agitating the products therein and for driving the products below a lower edge of the separating wall from the washing zone into the discharge zone from where the cleaned products are discharged by a discharging device.

Such apparatus is known in the art and for instance disclosed in the copending application Ser. No. 760,135, now U.S. Pat. No. 4,106,518 in which the discharging zone comprises an endless movable chain and a plurality of transverse sheet metal members projecting spaced from each other from the endless chain. The endless chain and the transverse sheet metal members connected thereto are guided within the discharge zone in the region of the upper surface of the washing solution in substantially horizontal direction and subsequently thereto over an inclined surface having an upper edge, with a discharge chute adjacent this upper edge so that the cleaned comminuted plastic material is moved along the guide surface and discharged through the discharge chute.

This discharge device of the known washing apparatus comprises a great number of movable parts which are liable to wear during extended use of this apparatus.

SUMMARY OF THE INVENTION

It is an object of the present invention to provide a washing apparatus of the aforementioned kind in which the number of movable parts of the discharge device are reduced to a minimum and constructed to be subjected to less wear than in the apparatus known in the art so that the apparatus of the present invention may be fully automatically operated in a continuous manner during extended time periods without requiring displacement of any worn part of the apparatus.

With these and other objects in view, which will become apparent as the description proceeds, the apparatus of the present invention for washing soiled comminuted products, especially comminuted plastic foils, bands or the like, mainly comprises an elongated container adapted to be filled up to a predetermined level with a washing solution and having a pair of opposite end walls and a bottom wall, separating wall means in the container between the end walls and having a lower edge below the predetermined level but above the bottom wall, in which the separating wall means define in the container a washing zone between one of the end walls and the separating wall means and a discharge zone between the separating wall means and the other end wall, an inlet communicating with the washing zone adjacent the one end wall for feeding soiled products into the washing zone, agitating means extending through the washing zone from the one end wall to the separating wall means, discharge means downstream of the discharge zone and comprising a casing adjacent the other end wall and a sieve drum rotatable in the casing about an axis extending transverse to the longitudinal direction of the elongated container and projecting with a portion thereof upwardly beyond the predetermined level, a discharge channel for discharging cleaned products and extending from the separating wall means over the discharge zone and the casing, with a portion of the sieve drum projecting into the discharge channel, and a washing solution discharge outlet communicating with the casing. The other end wall has in this construction an upper edge below the predetermined level of liquid in the container.

In this apparatus the cleaned comminuted products which float upwardly in the discharge zone are engaged by the sieve drum at the upper level of the washing solution, lifted from the latter and continuously fed into the discharge channel. The washing solution taken along by the comminuted products flows into the sieve drum and is discharged from the interior thereof by a conduit communicating with the interior of the sieve drum.

In order to assure that the comminuted particles are positively removed from the discharge channel, the latter is connected to a pneumatic transport device. The comminuted products are thus sucked out from the discharge channel.

The washing solution withdrawn from the interior of the sieve drum may be fed back into the container. Dirt particles in the withdrawn washing solutions may be separated by a filter therefrom so that even a considerably soiled washing solution can, after cleaning, be returned to the container. In order to remove even very fine particles of dirt, dissolved material or chemical material from the liquid which is returned to the container, the filter may be combined with an ion exchanger, or the latter may be constructed as such an ion exchanger. It is also possible to operate with inversion osmosis, ultrafiltration or similar apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
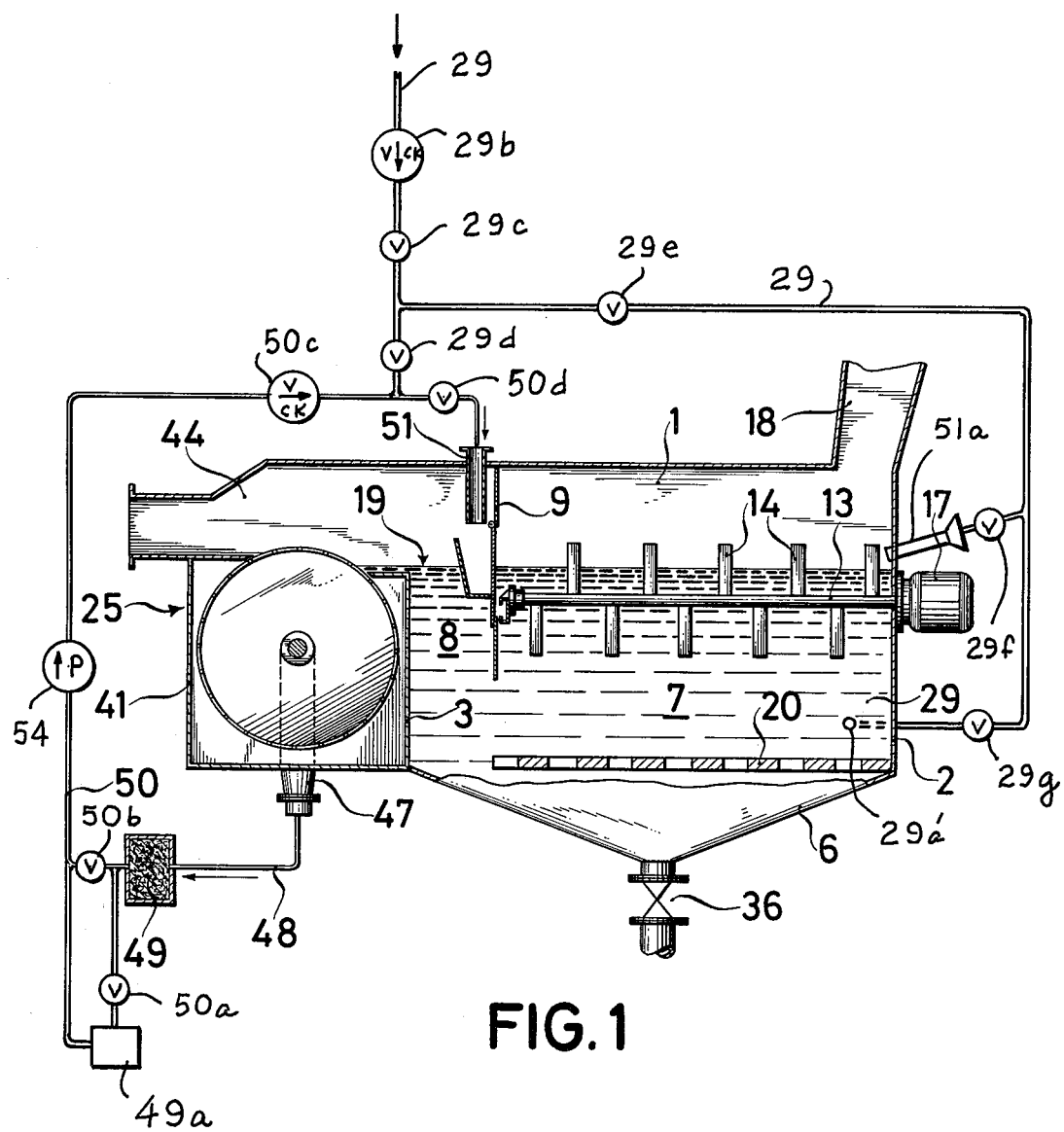
FIG. 1 is a longitudinal cross-section through the washing apparatus according to the present invention.

Referring now to the drawing, it will be seen that the washing apparatus according to the present invention comprises an elongated container 1 having a pair of end walls 2 and 3 and a funnel-shaped bottom wall 6. Separating wall means 9, 10 extend transversely through the elongated container adjacent to the end wall 3 and dividing the elongated container in a washing zone 7 and a discharge zone 8. An agitating or stirring device extends longitudinally through the washing zone 7. This agitating or stirring device comprises a pair of parallel horizontal shafts 13 located below the level of washing liquid in the container 1 and a plurality of paddles 14 projecting axially displaced and radially from the shafts 13. The shafts 13 are driven by a motor 17 and gearing mounted on the end wall 2 outside the container 1 in opposite directions. The container is provided with an inlet channel 18 adjacent the end wall 2 for feeding the soiled products to be cleaned into the washing zone 7. The apparatus includes further a wide mesh sieve 20 extending in horizontal direction through the washing zone 7 above the funnel-shaped bottom wall 6 of the container. A valve 36 communicating with the bottom end of the funnel-shaped bottom wall 6 serves to discharge foreign particles accumulating on the bottom wall 6 from the container 1, if such discharge is necessary. The construction so far described corresponds substantially to the construction of the above-mentioned prior-art apparatus.

The apparatus of the present invention differs from the known apparatus by the specific discharging device 25 located downstream of the discharge zone 8. As can be seen from FIGS. 1 and 2 the upper edge of the end wall 3 ends below the predetermined level 19 of a washing solution maintained in the container 1, so that the washing solution in the container may flow to the discharging device 25. The discharging device 25 comprises a casing 41, one end wall of which is formed by the aforementioned end wall 3 of the container 1. A discharge channel 44 extends over the discharge zone 8 and the casing 41 beyond the latter. A sieve drum 39 rotatable about a horizontal axis extending transverse to the direction of the flow of liquid from the discharge zone 8 towards the casing 41 is located in the latter. The shaft 40 of the sieve drum 39 is rotated by a motor, not shown in the drawing, in the direction of the arrow A indicated in FIG. 2. The sieve drum 39 extends transversely through the casing 41 between the side walls of the latter. The top of the casing 41 is covered by a guide metal sheet 43 extending from the upper edge 42 of the end wall 3 of the container over the casing and this guide sheet 43 is formed with an opening through which a portion of the sieve drum 39 projects into the discharge channel 44. The sieve drum 39 is connected to the rotating shaft 40 by spokes, not shown in the drawing. The sieve drum 39 may be closed or be open at opposite ends. In the construction shown in the drawing the sieve drum is open at least at one of the ends and at the same time the casing 41 is provided with an annular opening 46 extending with ample clearance about the shaft 40. The opening 46 is connected to a discharge conduit 47. It is also possible to provide on both sides of the casing 41 annular openings 46 and each provided with a discharge conduit 47 which are connected to a common further discharge conduit. The discharge opening 46 may also be arranged below the sieve drum 39 for instance at the bottom of the casing 41.

The comminuted products cleaned in the washing zone 7 leave the latter below the lower edge of te separating wall means 9, 10 and pass in the discharge zone 8 in which they float within the washing solution upwardly. Since the washing zone 7 and the discharge zone 8 communicate with each other, the liquid level in the two zones is substantially the same. The comminuted products floating upwardly in the discharge zone are engaged by the rotating sieve drum 39, lifted out of the washing solution and moved onto the guide sheet 43 to the left side, as viewed in FIG. 2, of the upper portion of the sieve drum 39. The liquid taken along by the comminuted products flows into the interior of the sieve drum 39 in which a liquid level corresponding to the location of the annular opening 46 is formed. The predrained comminuted products are then discharged through the outlet socket 45 to a further treating apparatus, not shown in the drawing. Such discharge may be expedited pneumatically, for instance by connecting the outlet socket 45 to a ventilator 55, schematically indicated in FIG. 2, which sucks the predrained comminuted products out of the discharge channel 44.

The washing solution discharged through the discharge conduit 47 from the casing 41 is conducted over a conduit 48 to a filter 49. A conduit 50 in which a pump 54 is arranged, leads from the filter 49 to an inlet socket 51 from where the filtered washing solution can be fed into a distributing trough 52, from where it passes over the edge of the latter into the discharge zone 8. The distributer trough 52 is provided so that the cleaned washing solution passing through the inlet socket 51 will not create turbulence in the discharge zone 8. As also shown in FIG. 1 a branch circuit in which a valve 50a is located branches off from the conduit 50 adjacent the outlet end of the filter 49 so that the washing solution discharged from the casing 41 may also be passed through an ion exchanger 49a downstream of the filter 49, when the valve 50a is opened and a valve 50b in the conduit 50 is closed. Fresh water may be fed from a conduit 20 into the conduit 51 downstream of a check valve 50c into the socket 51.

If comminuted products of different colors are to be washed separated from each other, then a quick emptying of the washing apparatus is necessary before products of different colors are fed into the washing apparatus.

A quick discharge of any comminuted products in the washing apparatus may be carried out by flushing the comminuted particles floating at the upper level 19 of the liquid therein towards and into the discharge channel 44. For this purpose an inclined nozzle 51a is provided at the end wall 2 of the container 1 above the liquid level 19 through which liquid under pressure is sprayed onto the floating comminuted products. For this purpose fresh water from the conduit 29 or cleaned washing solution passing through the conduit 50 or both may be used. For this purpose a branch conduit 29a branches off from the fresh water conduit 29 between the valves 29c and 29d in the latter. The branch conduit 29a leads over valves 29e and 29f to the spray nozzle 51a. If the valves 29c, 29e and 29f are open, while the valve 29d is closed only fresh water passing through the conduit 29 will be fed into the nozzle 51a. If the valve 29c together with the valve 50d in the conduit 50 are closed, while the valves 29d, and 29e and 29f are open, only recycled washing solution from the conduit 50 will be passed into the nozzle 51a. If the valves 29c, 29d, 29e and 29f are open, while the valve 50d is closed a mixture of fresh water and recycled solution may be fed into the nozzle 51a, whereby the check valve 29b in the conduit 29 will prevent that any recycled washing solution will not pass beyond this check valve into the conduit 29, if the pressure in the conduit 50 provided by the pump 54 should be greater than the pressure of the water fed into the conduit 29.

In order to permit the comminuted products pushed by the jet emanating from the nozzle 51a towards the separating wall 9 may pass into the discharge zone 8, the separating wall 9 is provided at a middle part thereof with a large opening 9a which, as clearly shown in the drawing, has an upper edge above the level 19 of the liquid in the container 1 and a lower edge considerably below this level. This opening is normally closed by a wall portion 10 to which the distributer trough 52 is connected and which is tiltable at its upper edge about a tilting axis 10a with respect to the stationary separating wall 9. If the wall 10 is tilted together with the distributing trough 52 about the tilting axis 10a, by conventional means not shown in the drawing, to the position as shown in dotted lines in FIG. 2, the opening 9a in the partition wall 9 is thus opened so that the comminuted products floating at the upper level of the liquid can freely pass into the discharge zone 8 from where they are discharged in the manner as described before by the sieve drum 39.

Any foreign particles loosened from the soil comminuted products fed into the washing zone 7 by the action of the stirring mechanism 13, 14 will fall through the wide meshed sieve 20 onto the funnel-shaped bottom wall 6 from where they may be discharged by opening the valve 36.

Fresh water may be fed through the conduit 29 when the valves 29c, 29d and 50d are opened and the valve 29e is closed together with the recycled liquid into the socket 51, or when the valves 29c, 29e and 29f are opened while the valve 29d is closed into the nozzle 51a to pass into the washing zone 7 while the opening 9a in the separating wall is closed. It is also possible to continue the conduit 29a beyond the valve 29f and lead it over a valve 29g to an inlet opening 29a' below the level of the liquid into the washing zone. In this case the valves 29d and 29f have to be closed whereas the valves 29c, 29e and 29g are open.

Figure 2:
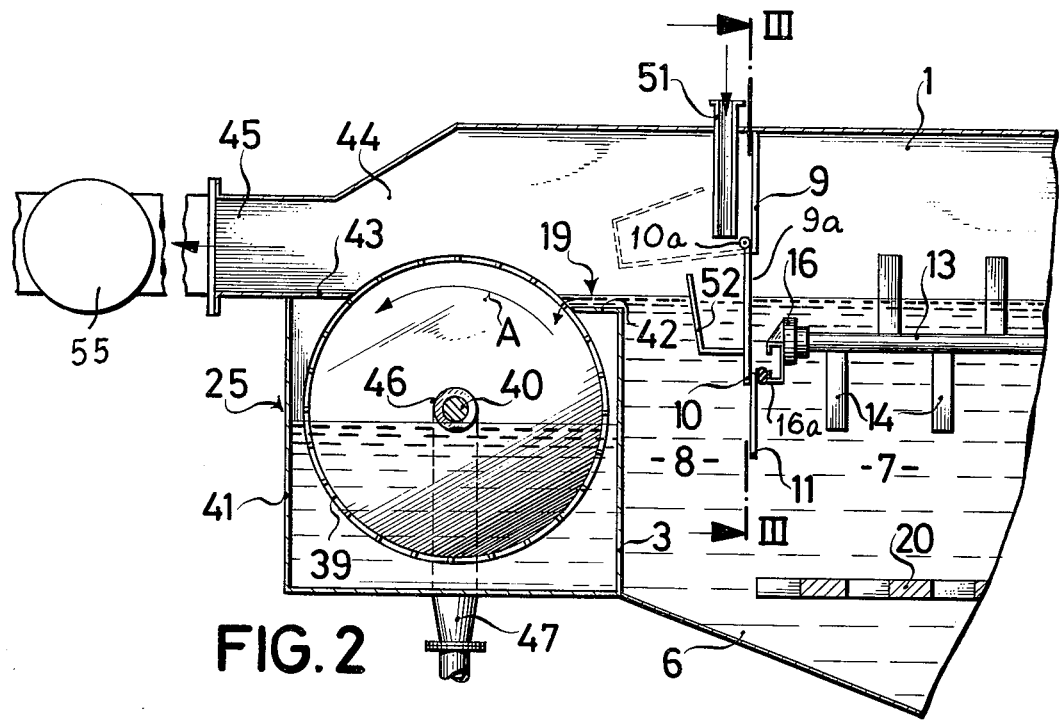
FIG. 2 is an enlarged longitudinal cross-section of the discharge device of the apparatus.
Figure 3:
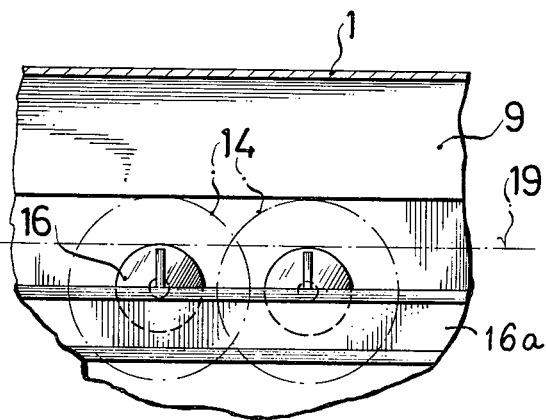
FIG. 3 is a transverse cross-section taken along the line III—III of FIG. 2.

The bearings 16 at the left end of the shafts 13, as viewed in FIGS. 1 and 2 are carried on a transverse beam 16a below the level of the liquid in the washing apparatus and this beam may be connected in any known manner to the separating wall 9 below the openings 9a formed therein. In certain cases it may be desirable to make the separating wall 9 out of two parts with the lower part raisable and lowerable by conventional means not shown in the drawing, so that the lower edge 11 of the movable part of the separating wall may be raised and lowered. In this case the beam 16 has to be connected by straps to the stationary upper part of the separating wall 9.

It will be understood that each of the elements described above, or two or more together, may also find a useful application in other types of apparatus for washing soiled comminuted products differing from the types described above.

While the invention has been illustrated and described as embodied in an apparatus for washing soiled comminuted products provided with a discharge device for the cleaned product constituted by a rotating sieve drum, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for washing soiled comminuted products, especially comminuted plastic foils, bands or the like, comprising an elongated container adapted to be filled up to a predetermined level with washing solution and having a pair of opposite end walls and a bottom wall; separating wall means in said container between said end walls and having a lower edge below said predetermined level but above said bottom wall, said separating wall means defining in said container a washing zone between one of said end walls and said separating wall means and a discharge zone between said separating wall means and the other end wall, said discharge zone being shorter than said washing zone; an inlet passage communicating with said washing zone adjacent said one end wall for feeding soiled products into said washing zone; agitating means extending through said washing zone from said one end wall to said separating wall means; discharge means downstream of said discharge zone and comprising a casing adjacent said other end wall and a sieve drum rotatable in said casing about an axis extending transverse to the longitudinal direction of said elongated container and projecting with a minor portion of its circumference upwardly beyond said predetermined level, said other end wall having an upper edge only slightly below said predetermined level, so that the soiled products will pass from the washing zone below said separating wall means and into said discharge zone to rise in the latter and to flow over the upper edge of said other end wall only onto the projecting portion of said sieve drum; a discharge channel for discharging cleaned products and extending from said separating wall means over that discharge zone and said casing with a portion of said sieve drum projecting into said discharge channel; and a washing solution discharge outlet communicating with said casing.

2. An apparatus as defined in claim 1, wherein said bottom wall of said container is funnel-shaped and having a lower outlet end and a valve for opening and closing said outlet end.

3. An apparatus as defined in claim 2, and including a screen extending transversely over an upper end of said funnel-shaped bottom wall at least through said washing zone.

4. An apparatus as defined in claim 1, and including pneumatic discharge means communicating with said discharge channel downstream of said sieve drum.

5. An apparatus as defined in claim 1, and incuding a recycling conduit communicating at one end with said discharge outlet and at the other end with at least one of said zones.

6. An apparatus as defined in claim 5, and including a filter in said recycling conduit.

7. An apparatus as defined in claim 6, and including an ion exchanger coordinated with said filter for removing fine particles and certain chemicals from said washing solution.

8. An apparatus as defined in claim 5, and including a pump in said recycling conduit for circulating the washing solution therethrough.

9. An apparatus as defined in claim 1, wherein said separating wall means comprises a stationary wall having a bottom edge below said predetermined level and being formed in a middle part thereof with a large opening having an upper edge above the predetermined level and a lower edge below said predetermined level, and a wall tiltably mounted at an upper edge thereof between a first position extending parallel to said stationary wall over said opening for closing the same and a second upwardly tilted position freeing said opening.

10. An apparatus as defined in claim 9, and including a washing solution distributing trough connected to said tiltable wall.

11. An apparatus as defined in claim 10, and including a recycling conduit communicating at one end with said discharge outlet, and means commmunicating with said other end of said recycling conduit for feeding the washing solution passing through said recycling conduit into said distribution trough.

12. An apparatus as defined in claim 9, wherein said agitating means comprise a pair of parallel shafts extending in longitudinal direction through said washing zone below said predetermined level and paddles projecting spaced from each other in radial direction from said shafts, each of said shafts being rotatably mounted at one end in said one end wall and at the other end in a bearing connected to said stationary wall of said separating wall means.

13. An apparatus as defined in claim 12, and including drive means for rotating said shafts in opposite directions.

14. An apparatus as defined in claim 9, and including nozzle means projecting from said one end wall inclined at an acute angle to said predetermined level toward said separating wall means for spraying a liquid under pressure onto said predetermined level of the washing solution in said washing zone for quick discharging soiled products from said washing zone while said tiltable wall is in said tilted position.

15. An apparatus as defined in claim 1, and including a sheet metal forming part of said discharge channel and extending from said upper edge of said other end wall over said casing, said sheet metal being provided with an opening through which said portion of said sieve drum projects into said discharge channel.

* * * * *